Figure 1:
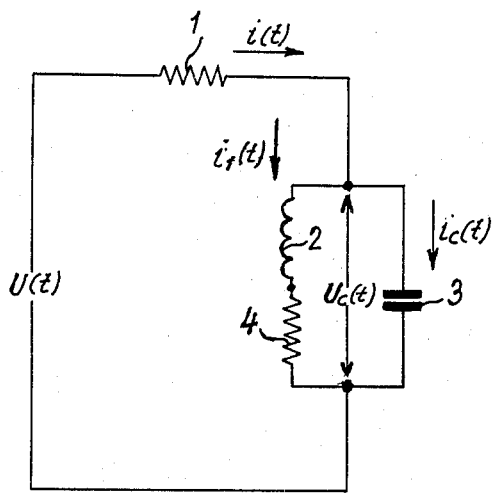

Sept. 8, 1959

H. R. LOOS 2,903,646

ELECTRIC MEASURING APPARATUS FOR MEASURING
THE TIME INTEGRAL OF MOMENTARY PULSES

Filed Aug. 9, 1957

2 Sheets-Sheet 1

INVENTOR.
Horst Rudolf Loos
BY

Sept. 8, 1959

H. R. LOOS 2,903,646

ELECTRIC MEASURING APPARATUS FOR MEASURING
THE TIME INTEGRAL OF MOMENTARY PULSES

Filed Aug. 9, 1957

2 Sheets-Sheet 2

INVENTOR.
Horst Rudolf Loos
BY

United States Patent Office 2,903,646
Patented Sept. 8, 1959

2,903,646

ELECTRIC MEASURING APPARATUS FOR MEASURING THE TIME INTEGRAL OF MOMENTARY PULSES

Horst Rudolf Loos, Nebusice, near Prague, Czechoslovakia, assignor to Statni vyzkumny ustav tepelne techniky Praha, Prague, Czechoslovakia Application August 9, 1957, Serial No. 677,273

Claims priority, application Czechoslovakia August 29, 1956

4 Claims. (Cl. 324—123)

The invention relates to an electric measuring apparatus for measuring the time integral of momentary pulses.

For measuring currents of short duration (so-called momentary currents) electromagnetic instruments, called ballistic galvanometers, are used.

Known ballistic galvanometers are substantially moving coil instruments having a relatively high inertia mass in order to achieve a sufficiently long period of oscillation. The rotary system is set in motion by a short current impact, which ends practically at the moment when the galvanometer is still in its position of equilibrium. Provided a suitable damping is arranged, an aperiodic oscillation is produced, the maximum deflection of which is proportional to the time integral of the current pulse. It is obvious that the current pulse may have any desired form, the latter having no influence upon the behaviour of the system, provided the condition is fulfilled that the duration of the current pulse is very short in comparison with the duration of the oscillation.

The use of ballistic galvanometers may be suitably extended also to the measuring of other values given by the time integral of the course of any desired value. In this way the absolute measuring of capacity, induction and inductance is carried out. Very short time intervals may preferably be measured by the ballistic method. Finally also the measurement of very small currents (as required for example in nuclear science) may be carried out with success by the ballistic method by charging a condenser of an exactly determined capacity with the current to be measured, whereupon, after the lapse of a certain time, the charge of the condenser is measured with a ballistic galvanometer.

In spite of the above mentioned advantages the ballistic electro-mechanical instruments are not free from some drawbacks. Ballistic galvanometers are extremely delicate instruments, requiring service by a highly skilled operator. This is the reason, why these instruments may be used exclusively in a laboratory and are practically unsuitable under actual working conditions. A further disadvantage of the existing ballistic galvanometers is the fact, that the connection of a ballistic galvanometer with electronic circuits causes difficulties and requires special care in manipulation.

The above drawbacks are removed by the present invention, which permits the use of the ballistic method by means of purely electric elements. The essence of the invention consists in a combination of known electric elements to form a system having a characteristic electrical equation which is an analogy of the characteristic mechanical equation of ballistic galvanometers. The invention provides further conditions for the dimensioning of a ballistic circuit as well as examples of their solution.

The use of purely electrical ballistic instruments according to the invention is at least as extensive as the above mentioned application of known ballistic galvanometers. Moreover, the instruments according to the invention are very simple, show a great mechanical resistance, are easy to control and do not require any skilled personnel for their servicing.

A further advantage of the instruments according to the invention is the possibility of their application not only for the measurement of powerful current impulses which would be liable to damage a usual ballistic galvanometer, but also for measuring very short pulses, which otherwise are difficult to measure.

The invention is based on the following theoretical considerations:

For the movement of the system of an electromechanical ballistic apparatus the following equation applies $$J\varphi'' + W\varphi' + D\varphi = F(t) \tag{1}$$

wherein $\varphi$=angular deflection of the rotary system of the apparatus (as function of the time $t$) and $\varphi'$ or $\varphi''$ its first and second differential coefficient $F(t)$=force produced by the exciting current pulse acting on the measuring system (also a function of the time $t$)

$J$=inertia moment of the system $W$=damping moment of the system $D$=torsional moment of the system The Equation 1 applies, of course, under the assumption that the damping of the system is proportional to the velocity (e.g. electromagnetic damping) and that the directional force (i.e. the force produced by the torque of the suspension) is proportional to the deflection. Further assumed are the initial values of the solution of the Equation 1, equal to zero, i.e. that prior to the arrival of the pulse $F(t)$ the entire system is at rest. In order to make the apparatus operate as a ballistic galvanometer, the constants $J$, $W$ and $D$ have to be chosen such, as to fulfill the conditions of an aperiodic extreme case. This assumption is fulfilled, if for example the constants comply with the following condition:

$$D = \frac{W^2}{4J} \tag{2}$$

Figure 2:
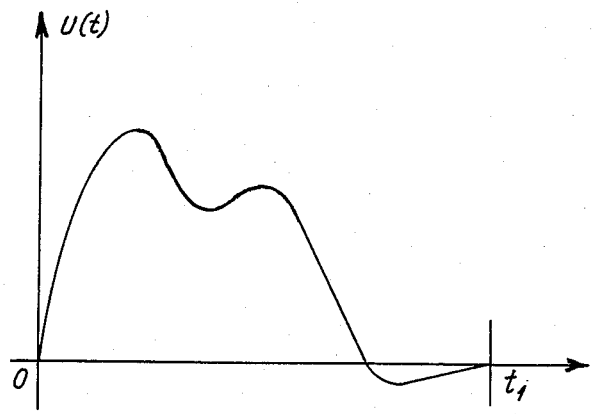
Figure 3:
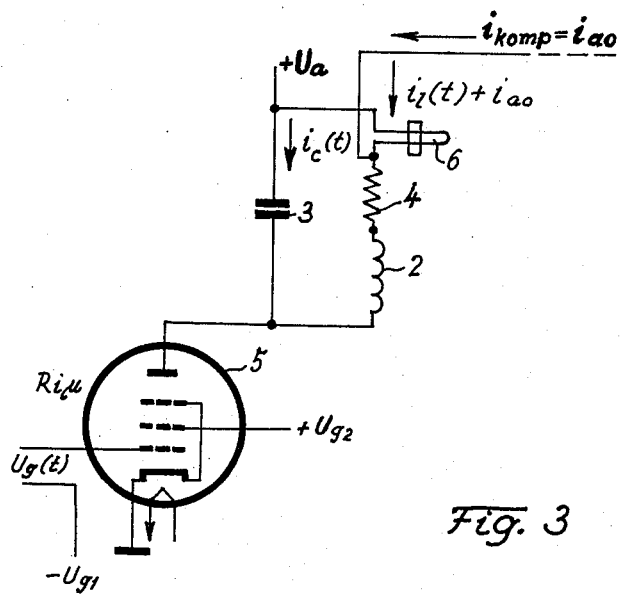
Figure 4:
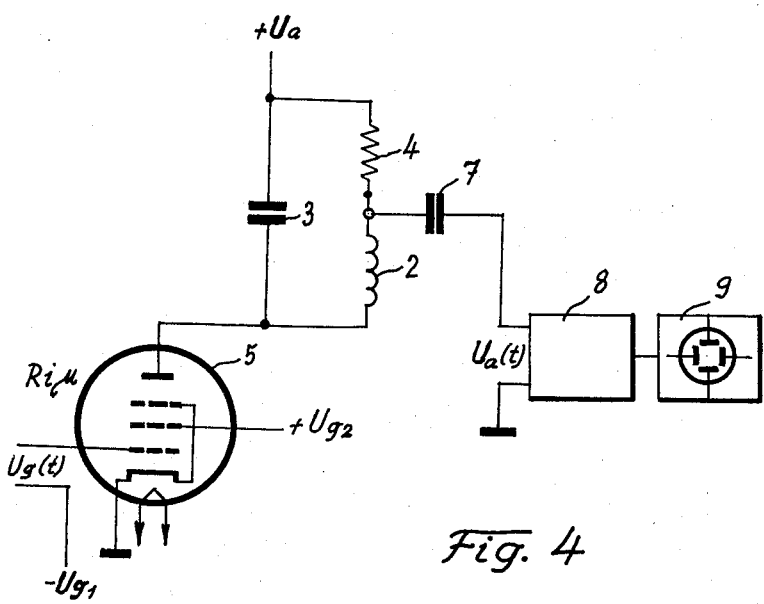

The manner of carrying out the present invention is shown in the accompanying drawings, wherein Fig. 1 shows a simple electric circuit, Fig 2 shows the usual form of the current pulse, Fig. 3 shows an example of a ballistic circuit according to the invention and Fig. 4 is a similar representation of a modified embodiment of the ballistic circuit.

The simple electric circuit represented in Fig. 1 comprises an ohmic resistance 1, an inductance 2, a capacity 3 and an ohmic resistance 4. Applying the Laplace transformation the following system of equations is valid for the shown connection:

$$i_1(p) + i_c(p) = i(p) \tag{3a}$$
$$p１.i_1(p) + Ri_1(p) = u_c(p) \tag{3b}$$
$$1/pC.i_c(p) = u_c(p) \tag{3c}$$
$$R_i.i(p) + u_c(p) = u(p) \tag{3d}$$

comprising the following constant values $L$=inductance of the coil 2
$R$=value of the resistance 4
$C$=capacity of the condenser 3
$R_i$=value of the resistance 1 and the variable values $u$=input voltage of the system
$i$=input current of the system
$u_c$=voltage on the condenser 3
$i_c$=current flowing through the condenser 3
$i_1$=current in the coil 2 (or in the resistance 4)
$p$=complex variable of the Laplace transformation.

From the Equations 3a, 3b, 3c, and 3d the Laplace transformation value of the differential equation for the current circuit may be derived $$i_1(p)[p^2CLR_i+p(CRR_i+L)+(R_i+R)]=u(p) \quad (3)$$

or, after retransformation to the range of the time $t$ $$CLR_ii_1''+(CRR_i+L)i_1'+(Ri+R)i_1=u(t) \quad (4)$$

wherein $i_1'$ and $i_1''$ denote the first or second differential coefficient respectively of the current $i_1$ with respect to time.

The Equation 4 having the same character as the Equation 1, the circuit shown in Fig. 1 may be considered an electric analogy of a ballistic galvanometer. In the same way as it is necessary for a mechanical system according to the Equation 1 that the condition (2) be fulfilled, it is indispensable to comply also with a similar condition for the constants in the Equation 4, in order to impart a truly ballistic character to the system shown in Fig. 1.

The present invention provides, however, for a more exact determination of conditions, which takes into account also a certain duration of the pulse, which in the hitherto known electromechanical ballistic apparatus has not been taken into consideration.

Fig. 2 shows a usual form of a pulse, the total duration of which amounts to $t_1$ seconds. The following assumptions have to be fulfilled in this case:

$$CRR_i \gg L \quad (5)$$
$$at_1 \leq 0.05 \quad (6)$$
$$R_i \gg R \quad (7)$$

wherein $t_1$=duration of the pulse $$a=\frac{CRR_i+L}{2CLR_i} \doteq \frac{R}{2L} \quad (6a)$$

By a solution of the equations for the case of aperiodic extreme damping the following condition is obtained $$C=\frac{4}{R}\frac{t_1}{0.1}=\frac{4}{R}\left(\frac{L}{R}\right) \quad (8)$$

The conditions (5), (6), (7), and (8) are of high importance and permits the dimensioning of ballistic circuits according to the invention.

The differential Equation 4 of the ballistic circuit may be written in the following form:

$$A_0i_1''+A_1i_1'+A_2i_1=u(t) \quad (4')$$

wherein
$A_0=CLR_i$
$A_1=CRR_i+L$
$A_2=R+R_i$

The Laplace transformation value of the Equation 4' reads as follows:

$$p^2A_0i_1(p)+pA_1i_1(p)+A_2i_1(p)=u(p) \quad (3')$$

from which there follows the expression for $i_1(p)$ $$i_1(p)=u(p)\frac{1}{A_0}\frac{1}{(p+a)^2+b^2} \quad (9)$$

wherein
$$a=A_1/2A_0 \quad (9a)$$
$$b^2=A_2/A_0-A_1^2/4A_0^2 \quad (9b)$$

Under the assumption that $b^2=0$ i.e. for the aperiodic extreme case, the Expression 9 may be written in the following form:

$$L=\{i_1(t)\}=\frac{1}{A_0}L\{u(t)\}L\{t.e^{-at}\} \quad (10)$$

the solution of which is $$i_1(t)=\frac{1}{A_0}\int_0^t u(t)(t-\tau)e^{-a(t-\tau)}d\tau \quad (11)$$

By a simple calculation the following relation is obtained from the Equation 11

$$i_1(t)=\frac{1}{A_0}te^{-at}\int_0^t u(\tau).e^{a\tau}.d\tau-\frac{1}{A_0}e^{at}\int_0^t u(\tau).\tau e^{a\tau}.d\tau \quad (12)$$

According to Fig. 2 the signal $u(t)$ exists only in the time interval of $t=0$ to $t=t_1$. The integrals in the Equation 12 have for all $t>t_1$ a constant value and $t_1$ may be inserted as their upper limit. The influence of the exponential member $e^{at}$ is eliminated by the choice of the constants by determining that $$e^{at}1 \doteq 1 \quad (12a)$$

which is one of the conditions for the dimensioning of the ballistic connection.

By the application of the means value theorem the Equation 12 is transformed into the following form:

$$i_1(t)=\frac{1}{A_0}te^{-at}\int_0^{t_1}u(\tau)d\tau-\frac{1}{A_0}e^{-at_2}\int_0^{t_1}u(\tau)d\tau \quad (13)$$

wherein $$0<t_2<t_1$$

there must be $$e^{-at}1 \doteq 1$$

For $t>t_1$ there is $$i_1(t)\bigg|_{t>t_1}=\frac{1}{A_0}(t-t_2)e^{-at}.Q \quad (14)$$

wherein $$Q=\int_0^{t_1}u(\tau)d\tau$$

this expression being constant for $t>t_1$.

From the above equation there follows that provided the connection is suitably dimensioned the value $t_2$ is negligible as compared with $t$ and that the integral reaches its constant value already when the factor $te^{-at}$ is still very small as compared with its maximum value.

The function $te^{-at}$ has at a time $t_{\max}=1/a$ a maximum and there is therefore $$i_{1 \max}=\text{konst. } Q \quad (15)$$

so that the maximum value of the current $i_1(t)$ in the ballistic connection according to Fig. 1 is proportional to the time integral of the voltage pulse $u(t)$.

The conditions for the dimensioning of the ballistic connection are therefore (a) $\quad 4A_0A_2=A_1^2$, from condition (9c) $\quad (16)$
(b) $\quad e^{at}1 \doteq 1$, from condition (12a) $\quad (17)$ The condition (17) or (12a) is practically fulfilled, when $$t_1 \leq \frac{0.05}{a} \quad (18)$$

because $$e^{0.05}=1.05 \quad (19)$$

The conditions for the dimensioning of the connection i.e. the Expressions 5, 6, and 7 result therefrom.

The above considerations apply for all possible courses of $u(t)$. When however, the apparatus is always excited by an impulse of the same form, e.g. in short duration measurements, a higher error may be admitted $$t_1 > \frac{0.05}{a} \quad (20)$$

which is compensated by a suitable graduation so as to achieve the required accuracy.

Examples of carrying out the ballistic circuit according to the present invention are diagrammatically represented in Figs. 3 and 4, wherein analogous elements are denoted with identical reference numerals.

Fig. 3 shows a ballistic circuit consisting of elements 2, 3 and 4, said circuit being connected to the anode circuit of a tube 5, the inner resistance of which corresponds to the resistance 1 (Fig. 1), having the value $R_i$. To the signal $u(t)$ (in Fig. 1) there corresponds a voltage $\mu.u_g(t)$ where $u_g(t)$ denotes the control voltage on the first grid of the tube 5 and $\mu$ its amplification factor. The current $i_1(t)$ is measured by means of an oscillographic loop 6, the resistance of which has to be added to the value of the resistance 4. The anode idle current $i_{a0}$ is compensated by a compensating current $i_{komp}$.

Another method of connection is shown in Fig. 4. Here the voltage drop $u_a(t)$ is measured on a resistance 4. This signal is fed through a condenser 7 to an amplifier 8 and after amplification indicated on an oscillograph 9.

In addition to the above described connection many further modifications are possible, none of which exceeds the scope of the present invention, insofar as an electric circuit (ballistic circuit) is produced, the characteristic equation of which is analogous to the Equation 1 and when the information with respect to the magnitude of the measured pulse by measuring the maximum deflection of a variable parameter (e.g. current intensity or voltage) is obtained.

The invention represents therefore a considerable improvement in the ballistic measuring method. Due to the fact that the instruments according to the invention are substantially simpler and easier to handle than the existing instruments and that also their scope of application is considerably extended, their extensive employment may be expected. The instruments according to the invention will constitute a welcome contribution to nuclear science for measuring very small electric currents, as well as in other lines, where very short time intervals have to be measured.

I claim:

1. Electrical measuring device for measuring the integral with respect to time of brief, singly occurring electrical pulses, comprising a parallel resonant circuit having as its elements, a coil, a condenser, and a resistor, a resistor in series with said resonant circuit in advance of the latter, means for feeding the electrical pulses which are to be measured through said series resistor, and a measuring device for measuring the current passing through said coil, said elements of the resonant circuit being so dimensioned that the value of the resistor of the parallel resonant circuit is negligible as compared to the value of the series resistor, and that the inductance value of said coil, in henrys, is negligibly small as compared to the numerical value of the product of the capacity of said condenser, in farads, and of the two resistors, in ohms, the duration, in seconds, of the pulse which is to be measured being smaller than $\frac{1}{10}$ of the numerical value of the quotient of the value of the inductivity of said coil, in henrys, and the value of said resistor of the parallel resonant circuit in ohms, and the dimensional condition for aperiodic limiting damping being fulfilled by capacitance value of said condenser, in farads, being four times the value of the quotient of the inductivity of said coil, in henrys, and of the square of the ohmic resistance of said parallel resonant circuit, in ohms.

2. Electrical measuring device according to claim 1, further comprising a pulse generator emitting the pulses to be measured and being connected to the parallel resonant circuit with an amplifier tube interposed therebetween, the internal resistance of said tube constituting said series resistor.

3. Electrical measuring device according to claim 2; further comprising an oscillograph measuring the current flowing through said coil, and means supplying a compensating current to compensate for the anode idle current of said amplifier tube.

4. Electrical measuring device according to claim 2; further comprising an oscillograph for indirectly measuring the current through said coil by the voltage drop at said resistor of the parallel resonant circuit, and means connecting said oscillograph to said parallel resonant circuit including a condenser and amplifying means.

References Cited in the file of this patent

UNITED STATES PATENTS

| | | |
|---|---|---|
| 1,324,054 | Irwin | Dec. 9, 1919 |
| 2,356,617 | Rich | Aug. 24, 1944 |
| 2,567,276 | Dicke | Sept. 11, 1951 |
| 2,670,460 | Gilbert | Feb. 23, 1954 |
| 2,739,474 | Sink | Mar. 27, 1956 |